United States Patent [19]

Ditzer

[11] 4,006,130
[45] Feb. 1, 1977

[54] TRISAZO DYESTUFFS CONTAINING ETHERIFIED OR ESTERIFIED HYDROXYL GROUPS

[75] Inventor: Reiner Ditzer, Odenthal-Vois–win-Germany

[73] Assignee: Bayer Aktiengesellschaft, Leverkusen, Germany

[22] Filed: Dec. 6, 1974

[21] Appl. No.: 530,443

[30] Foreign Application Priority Data

Dec. 6, 1973  Germany ............................. 2360708

[52] U.S. Cl. .................... 260/173; 260/157; 260/158; 260/169; 260/186; 260/206

[51] Int. Cl.[2] .................... C09C 31/18; D06P 1/06; D06P 3/00; D06P 3/60

[58] Field of Search ........................... 260/173, 169

[56] References Cited

UNITED STATES PATENTS

| | | | |
|---|---|---|---|
| 2,056,539 | 10/1936 | Schindhelm et al. | 260/169 X |
| 2,197,350 | 4/1940 | Schindhelm et al. | 260/145 C |
| 2,882,266 | 4/1959 | Keller et al. | 260/146 R |

FOREIGN PATENTS OR APPLICATIONS

| | | | |
|---|---|---|---|
| 598,057 | 1/1933 | Germany | 260/169 |
| 288,427 | 1/1953 | Switzerland | 260/160 |

*Primary Examiner*—Floyd D. Higel
*Attorney, Agent, or Firm*—Plumley and Tyner

[57] ABSTRACT

Polyazo dyestuffs which in the form of the free acid correspond to the formula

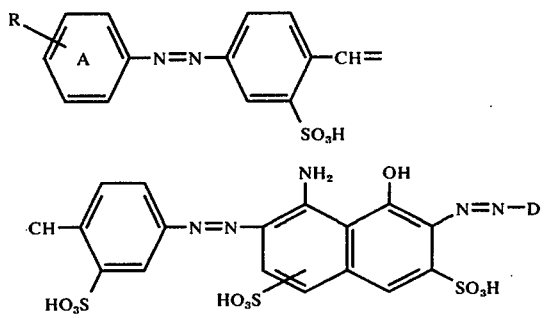

wherein R represents an etherified or esterified hydroxyl group in the o- or p-position, D represents the radical of a diazo component which, in the case that the sulpho group in the naphthalene ring is in the 4-position, is free of metallizable groups in the o-position and A can contain further substituents, are useful for the dyeing of hydroxy or nitrogen containing natural or synthetic fiber materials, for example, cellulose fibers in all states of processing, especially cotton and regenerated cellulose, as well as leather and paper.

1 Claim, No Drawings

TRISAZO DYESTUFFS CONTAINING ETHERIFIED OR ESTERIFIED HYDROXYL GROUPS

The invention relates to polyazo dyestuffs which in the form of the free acid correspond to the formula

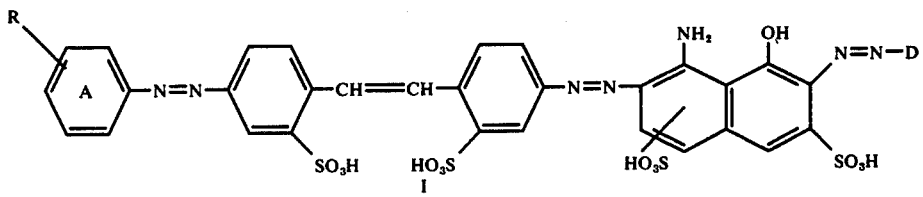

wherein
R represents an etherified or esterified hydroxyl group in the o- or p-position,
D represents the radical of a diazo component which, in the case that the sulpho group in the naphthalene ring is in the 4-position, is free of metallisable groups in the o-position and
A can contain further substituents.

The diazo components D can be either aromatic-carbo-cyclic or aromatic-heterocyclic.

Preferred dyestuffs correspond, in the form of the free acid, to the formula

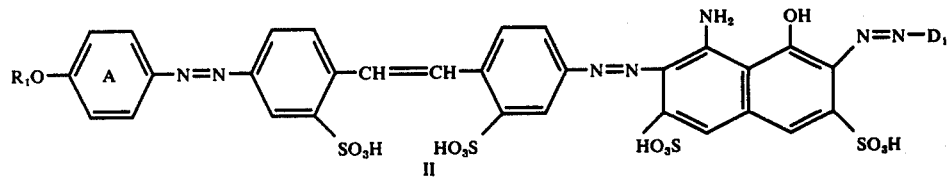

wherein
$R_1$ denotes a $C_1$-$C_4$-alkyl radical and
$D_1$ denotes an optionally substituted phenyl, naphthyl, triazolyl or benzthiazolyl radical.

Examples of suitable substituents for A are lower alkyl radicals with 1–4 C atoms.

Examples of suitable substituents for $D_1$ are alkyl groups, especially with 1 to 4 C atoms, alkoxy groups, especially with 1 to 4 C atoms, halogen atoms, nitro, hydroxyl, carboxyl, nitrile, alkylcarbonylamino with 2–5 C atoms, arylcarbonylamino, especially optionally substituted benzoylamino, aryloxy, especially optionally substituted phenoxy, arylazo, especially optionally substituted phenylazo, sulpho, arylamino, especially optionally substituted phenylamino, and $C_1$-$C_4$-monoalkylamino or dialkylamino.

Examples of possible substituents of the benzoylamino, phenoxy, phenylazo and phenylamino group are methyl, methoxy, chlorine, nitro and sulpho.

Very particularly preferred dyestuffs are those which in the form of the free acid correspond to the formula

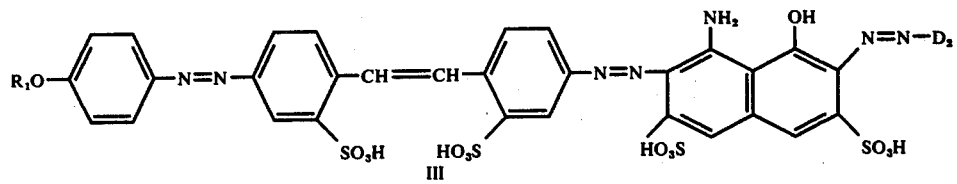

wherein
$R_1$ has the abovementioned meaning and
$D_2$ represents phenyl which is optionally substituted by halogen, $C_1$-$C_4$-alkyl, $C_1$-$C_4$-alkoxy, nitro, sulpho, $C_2$-$C_5$-alkylcarbonylamino, benzoylamino and benzoylamino substituted by methyl, methoxy, chlorine, nitro or sulpho.

Within the scope of the dyestuffs of the formula III, dyestuffs of particular importance are those in which $D_2$ represents a radical of the formula

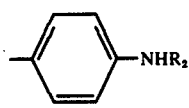

wherein
$R_2$ represents $C_2$-$C_5$-alkylcarbonyl or benzoyl which is optionally substituted by methyl, methoxy, chlorine, nitro or sulpho.

The dyestuffs of the formula I are obtained by coupling diazotised amines of the formula

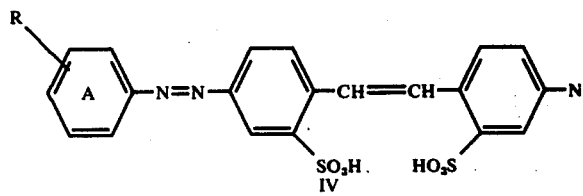

wherein
A and R have the abovementioned meaning with 1-amino-8-hydroxynaphthalene-3,6-disulphonic acid or -4,6-disulphonic acid in an acid aqueous medium, followed by coupling of the resulting disazo dyestuffs of the formula

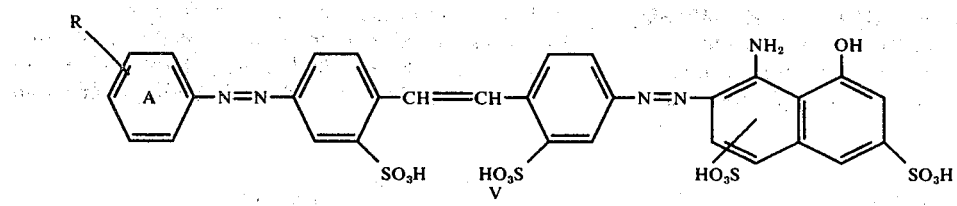

with diazotised amines of the formula

D—NH₂                                        VI in an aqueous alkaline medium.

The amines of the formula IV are obtained in a manner which is in itself known by diazotisation of 4-nitro-4'-aminostilbene-2,2'-disulphonic acid, coupling with an optionally substituted phenol, etherification or esterification of the phenolic hydroxyl group and reduction of the nitro group.

Examples of suitable amines (VI) are: aniline, 2-chloraniline, 3-chloroaniline, 4-chloroaniline, 1-aminobenzene-2-sulphonic acid, 1-aminobenzene-3-sulphonic acid, 1-aminobenzene-4-sulphonic acid, 1-amino-2-methylbenzene, 1-amino-4-methylbenzene, 1-amino-2-nitrobenzene, 1-amino-4-nitrobenzene, 1-amino-4-methoxybenzene, 1-amino-4-acetylaminobenzene, 1-amino-4-benzoylaminobenzene, 1-amino-4-(4-nitrobenzoylamino)-benzene, 1-amino-2-sulpho-4-(benzoylamino)-benzene, 1-amino-2-sulpho-4-(4'-nitrobenzoylamino)-benzene, 1-aminonaphthalene, 1-aminonaphthalene-4-sulphonic acid, 1-aminonaphthalene-6- and -7-sulphonic acid, 2-aminonaphthalene-6-sulphonic acid, 2-aminobenzthiazole, 3-amino-1,2,4-triazole, 5-amino-1,2,4-triazole-3-carboxylic acid, 4-[6-methylbenzthiazolyl-(2)]-aniline, 4-[6-methylbenzthiazolyl-(2)]-anilinesulphonic acid, 4-amino-azobenzene-4'-sulphonic acid and 4-aminoazobenzene-4'-hydroxy-3'-carboxylic acid.

The new dyestuffs are outstandingly suitable for dyeing and printing natural or synthetic fibre materials containing hydroxyl groups and natural or synthetic fibre materials containing nitrogen, for example cellulose fibres in all states of processing, especially cotton and regenerated cellulose, as well as leather and paper. Green dyeings with good fastness properties are obtained.

EXAMPLE 1

71 g of 4-amino-4'-(p-methoxyphenylazo)-stilbene-2,2'-disulphonic acid are stirred in 350 ml of water at 45° C. After adding 15 ml of 1 N sodium hydroxide solution, the mixture is warmed to 60° C. 33.3 ml of a 30% strength aqueous sodium nitrite solution are added and the (combined) solution is allowed to run into 135 g of ice, 270 ml of water and 45 ml of 1 N hydrochloric acid, with rapid stirring. The reaction mixture is stirred for a further hour at approx. 25° C.

Immediately prior to the 1st coupling, excess sodium nitrite is removed with a little amidosulphonic acid and the mixture is buffered to a pH value of approx. 2 with approx. 60 ml of a 20% strength aqueous sodium acetate solution. 41.6 g of 1-amino-8-hydroxynaphthalene-3,6-disulphonic acid, which was dissolved in 400 ml of water at approx. 35° C so as to form a neutral solution, mixed with 150 g of urea and adjusted to pH 3 with approx. 15 ml of 1 N hydrochloric acid immediately prior to the 1st coupling, are then allowed to run rapidly into the suspension of the diazotised amine. The pH value is adjusted to 2.5 with 20% strength aqueous sodium acetate solution.

After stirring for several hours at 25–30° C, the coupling is complete. 13 g of aniline are diazotised in a known manner and added to the solution of the disazo dyestuff which has beforehand been neutralised with approx. 45 g of 1 N sodium hydroxide solution and mixed with 70 g of sodium carbonate. After stirring for several hours, the coupling is complete. The mixture is warmed to 70° C and 250 g of sodium chloride are added to precipitate the dyestuff. After stirring for approx. 1 hour, the product is filtered off. After drying at 90° C, approx. 350 g of dyestuff, which dyes cotton green, are obtained.

260 ml of water at 50–60° C are introduced into a dyeing beaker of 500 ml capacity which is located in a water bath which can be heated, and 10 ml of 10% strength sodium sulphate solution and 1 ml of 10% strength sodium bicarbonate solution are added. 0.25 g of the dyestuff is worked into a paste with 2 ml of cold water and 30 ml of water at 50–60° C are added to the paste, whereupon the dyestuff dissolves. The dyestuff solution is introduced into the first solution and 10 g of a cotton fabric are introduced into the dyebath and continuously agitated therein. The temperature of the dyebath is brought to 85°–90° C over the course of 30 minutes and is kept at this temperature for 1 hour. The dyed material is then taken out, freed from adhering dyeing solution by wringing out, rinsed with cold water for 5–10 minutes and dried at 60–70° C.

Further dyestuffs are obtained when the disazo dyestuff intermediate products are reacted with the diazo components D-NH₂ listed in the table.

If, in Example 1 and Examples 2 to 19, 1-amino-8-hydroxynaphthalene-3,6-disulphonic acid is replaced by an equal amount of 1-amino-8-hydroxy-4,6-disulphonic acid, further valuable dyestuffs are obtained, which give green dyeings on cotton.

| Example No. | Diazotised amine D—NH₂ | Colour shade on cotton |
|---|---|---|
| 2 | 4-Chloroaniline | green |
| 3 | 1-Aminobenzene-4-sulphonic acid | green |
| 4 | 1-Amino-4-methylbenzene | green |
| 5 | 1-Amino-4-nitrobenzene | green |
| 6 | 1-Amino-4-methoxybenzene | green |
| 7 | 1-Amino-4-acetylaminobenzene | green |
| 8 | 1-Amino-4-benzoylaminobenzene | green |

-continued

| Example No. | Diazotised amine D—NH₂ | Colour shade on cotton |
|---|---|---|
| 9 | 1-Amino-4-(4-nitrobenzoylamino)-benzene | green |
| 10 | 1-Amino-2-sulpho-4-benzoylamino-benzene | green |
| 11 | 1-Amino-2-sulpho-4-(4-nitrobenzoylamino)-benzene | green |
| 12 | 4-Aminoazobenzene-4'-sulphonic acid | green |
| 13 | 4-Amino-4'-hydroxy-azobenzene-3'-carboxylic acid | green |
| 14 | 1-Aminonaphthalene-4-sulphonic acid | green |
| 15 | 2-Aminonaphthalene-6-sulphonic acid | green |
| 16 | 3-Amino-1,2,4-triazole | green |
| 17 | 5-Amino-1,2,4-triazole-3-carboxylic acid | green |
| 18 | 4-[6-Methylbenzthiazolyl-(2)]-aniline | green |
| 19 | 4-[6-Methylbenzthiazolyl-(2)]-aniline-monosulphonic acid | green |

I claim:
1. Polyazo dyestuff which in the form of the free acid corresponds to the formula

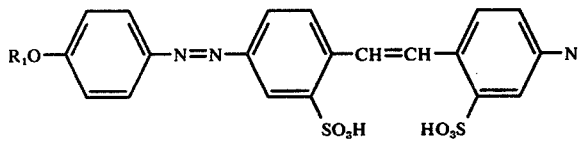

-continued

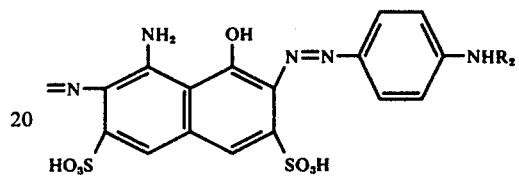

wherein
$R_1$ is $C_1$–$C_4$-alkyl; and
$R_2$ is $C_2$–$C_5$-alkylcarbonyl or benzoyl wherein said benzoyl is unsubstituted or substituted in the benzene nucleus by methyl, methoxy, chlorine, nitro, or sulpho.

* * * * *